Sept. 6, 1966   L. E. BARTH   3,270,582
MECHANICAL DEVICE
Filed Jan. 3, 1964

INVENTOR.
L. ELLSWORTH BARTH
BY
Nelson E. Kimmelman
ATTORNEY

United States Patent Office 3,270,582
Patented Sept. 6, 1966

3,270,582
MECHANICAL DEVICE
Lewis Ellsworth Barth, Langhorne, Pa., assignor to Automatic Timing & Controls, Inc., King of Prussia, Pa., a corporation of Pennsylvania
Filed Jan. 3, 1964, Ser. No. 335,577
8 Claims. (Cl. 74—568)

This invention relates to cams and especially to a cam whose position relative to a cam shaft may be varied.

There are many control or timing operations, for example, which employ one or more cams positioned on a cam shaft, there being a number of cam follower switch fingers which engage the cam surface. Ordinarily, most cams are disposed in a fixed positional relation to the shaft. In many applications, however, it would be desirable to be able to adjust the rotary position of the cam with respect to the shaft. This would enable the operator to vary the program of the controlled or timed operation or to make slight correctional adjustments to compensate for changes in other components.

It is therefore among the object of the present invention to enable a cam to vary its position relative to a member on which it is mounted.

It is also an object of the invention to provide an inexpensive and simple mechanism for providing a cam whose rotary position upon a cam shaft may be easily varied.

Still another object of the invention is to provide an adjustable cam assembly comprising two sub-assemblies which snap into locking engagement with one another.

Yet another object of the invention is to provide an adjustable cam assembly comprising two sub-assemblies which are made to engage one another in a fashion which effectively eliminates backlash.

Other objects of the invention will also occur to those skilled in the art upon perusal of the drawings, specification and claims herein.

In accordance with the present invention I provide a cam assembly which includes a cam member and an associated worm and spider subassembly. The cam member is mounted so as to permit adjustment of its rotary position on the cam shaft. The cam member has a cam surface as well as a portion in which a number of recesses are formed. The spider subassembly is fixedly mounted to the cam shaft for rotation therewith and has a portion which is constructed to fit into the cam member. The spider includes a worm mounted thereupon which, when the spider is pressed into the cam member, engages the recesses on the latter. The worm is provided with means for turning it whereupon the cam member is caused to revolve to any desired rotary position with respect to the cam shaft. An added feature of the invention is the fact that when the spider snaps into engagement with the cam member the worm is resiliently pressed into the cam recesses with a force sufficient to prevent backlash.

Figure 1:
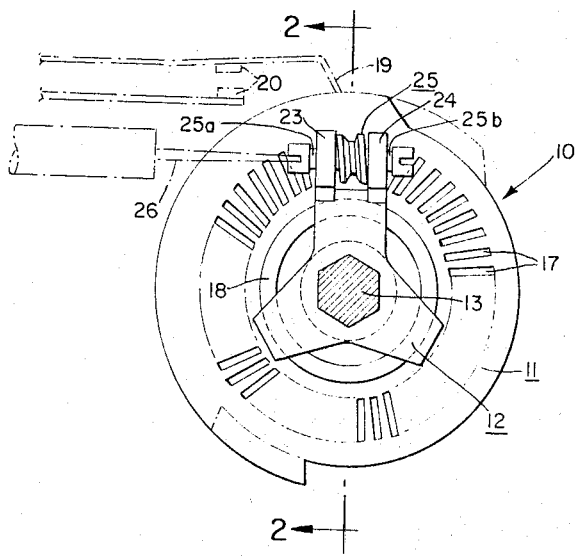
FIGURE 1 is a side elevation view of the cam assembly according to one form of my invention.

Referring to FIGS. 1, 2, 2A and 3, there is shown an adjustable cam assembly 10 made of a plastic such as molded nylon, for example, which comprises a cam member 11 and a spider subassembly 12. The spider subassembly 12 has a central annular portion 22 having a hexagonal bore or passageway 21. The passageway 21 is shaped to fit over a hexagonal cam shaft 13 which is driven by an appropriate source of power (not shown).

The portion 22 of spider 12 is pressed into the aperture 28 of cam member 11 until the circular ridge 16 in the bore of member 11 snaps into the groove 27 in the portion 22. An annular projecting portion 18 is formed on a lateral surface of cam member 11 which spaces the spider properly from the spider member and also provides a low friction-bearing surface in contact with the spider. To facilitate the snapping action of the spider into the cam, the bore 21 has a slightly tapered surface 21a which is compressed toward the shaft 13 when the ridge 16 rides over the end of the outer surface of portion 22 and decompresses when the ridge 16 engages groove 27.

When the members are thus engaged, the worm 25 has its threads resiliently pressed into engagement with recesses 17 which are formed in a row in one lateral surface 11a of the cam member 11. The worm 25 is mounted on the spider by having two narrow diameter portions 25a and 25b which fit within arcuate cut-out or molded portions of two aligned cradle projections 23 and 24 of the spider 12. The cam and spider members are so constructed that the worm is pressed into the recesses 17 with a force sufficient to prevent the cam member from rotating with respect to the spider when the worm is at rest.

In order to change the position of the cam member 11 relative to the shaft 13, the worm 25 is provided with two end slots 25c and 25d into which the blade of an adjusting screwdriver 26, for example, may be inserted. Upon rotation of the worm 25, the recesses 17 and hence cam 11 are forced to move in a rotary path to a desired point. As a result, the angular positions of the cam edges 14 and 15 relative to the shaft 13 and hence to the cam following finger 19 of a switch (shown in phantom, FIG. 1) will change thereby changing the instant of time at which the contacts 20 of that switch will "make" or "break" as the case may be.

Figure 2:
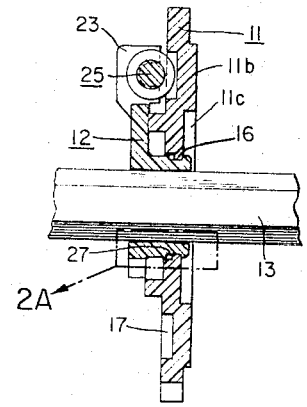
FIGURE 2 is a sectional view of the apparatus shown in FIG. 1 taken along the section line 2—2.
Figure 2A:
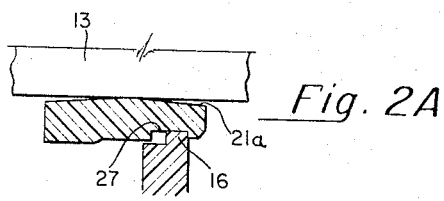
FIGURE 2A is an enlarged view of a corresponding section of the apparatus shown in FIG. 2.
Figure 3:
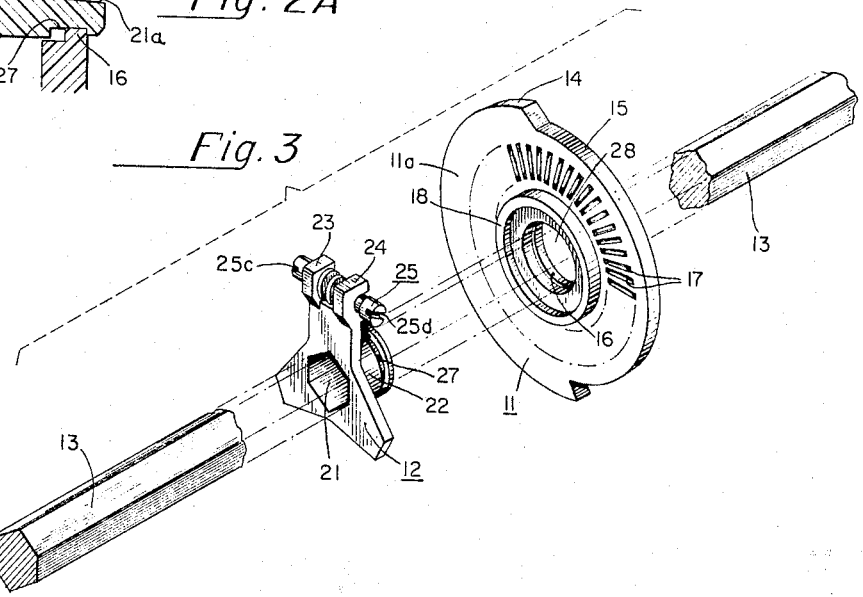
FIGURE 3 is an exploded view of the apparatus shown in FIGS. 1 and 2.

It will be noticed from FIG. 2 that the right lateral surface of the cam member 11 may be formed to have an essentially planar surface 11b so that, if desired, another similar cam member may be placed with its flat lateral surface against the corresponding portion 11b of member 11. The annular recess 11c has a depth sufficient to extend beyond the tip of portion 22 of the spider.

Other modifications of my invention which do not depart from the essence thereof will doubtless occur to those skilled in the art upon reading this application. Consequently, I desire my invention to be limited solely by the claims herein.

I claim:
1. A cam assembly comprising:
 (a) a first member having a cam surface portion and also having a plurality of thread-engaging means formed on a substantially flat-side surface portion thereof, said other portion being substantially transverse to said cam surface portion, and
 (b) a second member which includes gear means disposed so that only a small portion of its threads are pressed forcefully against said thread-engaging means at any time, said second member being constructed to cause rotation of said first member when said gear means are rotated.

2. A cam assembly comprising:
 (a) a first member having a cam surface portion and also having a plurality of recesses formed on a substantially flat side surface thereof, said other portion being substantially transverse to said cam surface portion, and (b) a second member which includes a gear being disposed so that only a very small portion of its threads are pressed forcefully into said recesses at any time, said second member being constructed to produce rotation of said first member when said gear is rotated.

3. A cam assembly comprising:
(a) a first substantially disk-shaped member having a cam surface portion and also having a plurality of recesses formed on a substantially flat side surface thereof, said other portion being substantially transverse to said cam surface portion, and
(b) a second member which includes a worm only a very small portion of whose threads engage said recesses, said second member being constructed to lock into engagement with said first member thereby pressing said portions of said threads forcefully against the walls of said recesses and being constructed to cause said first member to rotate when said gear is rotated.

4. A cam assembly comprising:
(a) a generally disk-shaped cam member which is essentially planar and includes an aperture therein, said member having a cam edge and a plurality of recesses formed in at least one of the two opposed surface portions thereof, and
(b) a spider member made principally of a resilient and deformable material and includes a worm and also includes a generally annular projecting portion, said projecting portion being constructed to fit within said aperture of said cam member whereupon only a very small portion of the threads of said worm are pressed forcefully against the walls of said recesses, said worm being constructed to cause said first member to rotate when said gear is rotated.

5. The cam assembly according to claim 4 wherein said recesses are arranged in said one surface in a generally circular row.

6. The cam assembly according to claim 4 wherein said cam member has a generally circular central aperture with a circular ridge formed thereupon, and wherein said annular projecting portion of said spider member includes a peripheral circular groove, said projecting portion being disposed within said aperture whereby said ridge lockingly engages said groove, said locking engagement causing said worm to be pressed into said recesses with a force sufficient to substantially prevent rotation of said cam member when said worm is at rest.

7. The cam assembly according to claim 6 wherein said spider member includes a bore through which a cam shaft is passed, said bore having a greater diameter in the region thereof located near the outer terminal portion of said annular portion thereby to permit said ridge to compress said terminal portion inwardly toward said cam shaft when said annular portion is inserted into the aperture of said cam member.

8. The cam assembly according to claim 7 wherein said spider member has three radially disposed arms, one of said arms including a plurality of cradle projections having arcuate portions into which said worm is inserted, and wherein said cam member has an annular raised portion on the surface thereof in which said recesses are formed, said raised portion being arranged to bear against said spider member and to assist in spacing said two members properly from one another.

References Cited by the Examiner

UNITED STATES PATENTS

| | | | |
|---|---|---|---|
| 476,439 | 6/1892 | Bancroft | 74—424.7 |
| 608,041 | 7/1898 | Harris | 64—24 |
| 3,080,770 | 3/1963 | Fissora et al. | 74—568 |

FOREIGN PATENTS

| | | |
|---|---|---|
| 3,216 | 2/1895 | Great Britain. |
| 192,295 | 2/1923 | Great Britain. |

FRED C. MATTERN, JR., *Primary Examiner.*

BROUGHTON G. DURHAM, *Examiner.*

W. S. RATLIFF, *Assistant Examiner.*